United States Patent Office 3,334,143
Patented Aug. 1, 1967

3,334,143
METHANOL OXIDATION OVER SILVER-CADMIUM ALLOY
Alvin B. Stiles, Wilmington, Del., assignor to E. I. du Pont de Nemours and Company, Wilmington, Del., a corporation of Delaware
No Drawing. Filed July 5, 1963, Ser. No. 293,156
1 Claim. (Cl. 260—603)

This application is a continuation-in-part of my copending application Ser. No. 2,802, filed Jan. 18, 1960, now abandoned.

This invention relates to silver catalysts and is more particularly directed to silver catalysts which contain small amounts of cadmium and to processes employing such catalysts.

Silver catalysts have heretofore been widely used as oxidation catalysts. They have been used for example in the oxidation of methanol to produce formaldehyde and in a variety of other reactions of organic compounds which involve oxidation which often is accompanied by dehydrogenation.

I have found that the inclusion of a small amount of cadmium in silver catalysts effects better conversion in organic oxidation processes without loss of yield and, in those processes involving it, effects better dehydrogenation.

Silver catalysts are already in wide use for oxidation of methanol to form formaldehyde and catalysts modified according to the invention produce even better results than those normally obtained with silver catalysts. It is advantageous to effect methanol oxidation in mixtures with air which are rich in methanol to minimize the size of the equipment required for the reaction. The conversion of methanol to formaldehyde in a methanol-rich process proceeds both by oxidation and by dehydrogenation. Catalysts of the present invention are more effective for both reactions than the usual silver catalysts.

Catalysts of the invention can be made in any convenient manner and ordinarily an alloy with silver and cadmium will be prepared simply by fusing the two components together in the desired proportions. Instead, finely divided powders of the two metals can be brought together and sintered to form what is, still, essentially an alloy.

The amount of cadmium can vary from about 1 to 15% by weight based upon the weight of silver. Amounts much lower than 1% are not effective to produce effects of any magnitude. Above 15% the directivity of the catalysts falls off and the catalyst additionally becomes lower melting. It is preferred to use from about 4 to 10% of cadmium.

The silver catalysts of the invention can be prepared in any convenient form of the types heretofore used for silver. Thus the silver-cadmium alloys can be formed as wire, as silver gauze, as machine turnings, or as pellets. Additionally the silver can be supported upon various carriers in conventional manner, it being sufficient for the purposes of the invention that the silver alloy be presented to the organic materials to be reacted.

Catalysts of the invention can effectively be used for any of the catalytic reactions for which silver has heretofore been employed. Thus they can be used for such reactions as the following:

(1) Oxidation and dehydrogenation of methanol to formaldehyde;
(2) Oxidation of alkenes such as oxidation of ethylene to ethylene oxide and propylene to acrolein and acrylic acid or to propylene oxide;
(3) Propane and ammonia to acrylonitrile;
(4) Propylene and ammonia to acrylonitrile;
(5) Butane to succinic anhydride;
(6) Benzene to maleic and fumaric anhydride; and
(7) Naphthalene to phthalic anhydride.

In order that the invention may be better understood reference should be had to the following illustrative examples.

Example 1

One hundred ninety grams of pure silver were fused with 10 grams metallic cadmium. The uniform ingot was machined in such a way as to produce wire filaments approximately 0.01 inch in diameter. These wires were inserted into a single tube reactor. An air-methanol mixture was fed to one end and the oxidized product was removed and quickly cooled at the other. The reactor was heated externally to initiate the reaction. Air to methanol ratios were altered to attain various reaction temperatures. This catalyst was evaluated at 600° C. and 700° C. with the following results:

| Catalyst | Temperature, ° C. | Of 100 Moles of $CF_3OH$ | | |
|---|---|---|---|---|
| | | Moles to HCHO | Moles Unreacted | Moles to $CO+H_2$ |
| 95% Ag 5% Cd | 600 | 61.5 | 30.8 | 7.7 |
| 95% Ag 5% Cd | 700 | 75.4 | 16.0 | 8.6 |

Using 1% of cadmium the following results were obtained:

| Catalyst | Temperature, ° C. | Of 100 Moles of $CF_3OH$ | | |
|---|---|---|---|---|
| | | Moles to HCHO | Moles Unreacted | Moles to $CO+H_2$ |
| 99% Ag 1% Cd | 600 | 57.9 | 34.7 | 7.4 |
| 99% Ag 1% Cd | 700 | 70.6 | 20.7 | 8.7 |

Using 10% of cadmium the following results were obtained:

| Catalyst | Temperature, ° C. | Of 100 Moles of $CF_3OH$ | | |
|---|---|---|---|---|
| | | Moles to HCHO | Moles Unreacted | Moles to $CO+H_2$ |
| 90% Ag 10% Cd | 600 | 66.9 | 27.2 | 5.9 |
| | 700 | 71.4 | 15.3 | 13.3 |

In the following table the above results are compared with a silver catalyst not containing cadmium. Water was added to the airstream in the amount of 25% of the volume of the air used to increase yield in accordance with customary practices.

| Catalyst | Temperature, ° C. | Of 100 Moles of $CF_3OH$ | | |
|---|---|---|---|---|
| | | Moles to HCHO | Moles Unreacted | Moles to $CO+H_2$ |
| Pure Ag | 600 | 52.8 | 38.2 | 9.0 |
| Do | 700 | 66.2 | 23.6 | 10.2 |

Water was not added when cadmium was used because it is unnecessary to add it to obtain high yields. Without the addition of water the silver catalyst alone will lead to decomposition which is not obtained with the catalysts of the invention. There is an advantage in omitting water because the equipment size is minimized and water need not be removed from the product.

It is noted incidentally that the high effectiveness of the catalysts of the invention in dehydrogenation leads to an off-gas which contains considerable usable hydrogen.

A catalyst containing 85% of silver and 15% of cadmium can similarly be used for the oxidation and dehydrogenation of methanol to formaldehyde.

The catalysts of the invention and especially those just described can similarly be used in processes in which silver catalysts have heretofore been employed. Thus the following additional examples are given in which the processes are conventional except for the catalyst used.

*Example 2*

Ethylene is oxidized to ethylene oxide in 78% yield and 100% conversion at 400° C. when a stream comprising 2 to 4% ethylene in air is passed over the catalyst having a composition of 95% Ag and 5% Cd.

*Example 3*

Propylene is oxidized to a mixture of acrylic acid and acrolein when a mixture comprising 7% $O_2$, 14% propylene and 79% nitrogen is passed at 400° C. over the catalyst having a composition of 85% Ag and 15% Cd. Conversion per pass is 70% of the propylene and the yield to acrolein and acrylic acid totals 64%. Higher temperatures favor higher conversions but lower yields, whereas lower temperatures favor lower conversions and higher yields.

*Example 4*

Propane is oxidized also to a mixture of acrolein and acrylic acid when a mixture comprising 7% $O_2$, 14% propane and 79% water vapor is passed at 570° C. over the catalyst having a composition of 91% Ag and 9% Cd. Conversion per pass is 62% of the propane and the yield to acrolein and acrylic acid totals 60%.

*Example 5*

A mixture of two parts propane, one part oxygen and three parts ammonia is reacted to produce acrylonitrile. The mixture is fed at 650° C. over a 90% Ag, 10% Cd alloy as matted wires 0.01 inch in diameter. Conversion per pass is 20% of the propane of which 60% is converted to acrylonitrile.

*Example 6*

A mixture of two parts propylene, one part oxygen and three parts ammonia is reacted to produce acrylonitrile. The mixture is fed at 600° C. over a 94% Ag, 6% Cd alloy as matted wires 0.01 inch in diameter. Conversion per pass is 22% of the propylene of which 63% is converted to acrylonitrile.

*Example 7*

A mixture of 5% butane in air is converted to maleic anhydride over a catalyst comprising 95% Ag and 5% Cd. The temperature of oxidation is 375° C.; at this temperature 20% of the butane is reacted and of this 20%, 70% is converted to maleic anhydride.

*Example 8*

A mixture of three volume percent of vaporized benzene and 97 volume percent air is converted over a 97% Ag, 5% Cd catalyst to maleic anhydride. The temperature of oxidation is 600° C. at which temperature the benzene is entirely converted. Eighty percent of the benzene is converted to maleic anhydride.

*Example 9*

Naphthalene is converted to phthalic anhydride utilizing a catalyst composed of 95% Ag and 5% Cd. The reaction temperature is 425° C. The feed composition is 4 volume percent naphthalene and 96 volume percent air, and the conversion is essentially 100%. Of the naphthalene fed more than 90% is converted to phthalic anhydride.

*Example 10*

In Example 9, orthoxylene is substituted for the naphthalene and the orthoxylene volume percent is approximately 5 whereas that of air is approximately 95. Conversion of the orthoxylene is, from a practical standpoint complete, and of the orthoxylene fed, more than 80% is converted to phthalic anhydride.

*Example 11*

Cyclohexane is oxidized to a mixture of cyclohexanone and cyclohexanol when employing a catalyst having a composition of 88% Ag and 12% Cd. In this case the catalyst is supported on a fused alumina granular support. A mixture of 6 weight percent of cyclohexane and 94 weight percent air is reacted over a catalyst composed of 85% Ag and 15% cadmium in the form of 0.01 inch diameter wires matted to form a catalyst mass. At a temperature of 190° C. essentially all of the cyclohexane was converted to oxidized products. Of the cyclohexane fed, slightly more than 70% was reacted either to cyclohexanone or cyclohexanol.

In this and all of the foregoing examples it is understood that adequate means must be taken to control the temperature near the value specified. It should also be pointed out that the gas mixtures are, in this and some of the foregoing examples, in the explosive range. Adequate mixing and control devices must be provided to avoid uncontrolled flame propagation.

I claim:

In a process for the oxidation of methanol to formaldehyde with air, the improvement comprising catalyzing the reaction with a catalyst which consists essentially of silver-cadmium alloy containing 1 to 15% of cadmium, the catalyst presenting such alloy to reactants.

References Cited

UNITED STATES PATENTS

| | | | |
|---|---|---|---|
| 2,491,057 | 12/1949 | Nevison et al. | 260—348.5 |
| 2,763,696 | 9/1956 | Finch et al. | 260—475 X |
| 2,837,473 | 7/1958 | MacCormack et al. | 252—475 X |

OTHER REFERENCES

Frankenburg et al., Advances in Catalysis, vol. VII (1955), pp. 27–28.

Paquin, Epoxydverbindungen and Epoxydharze (1958), pp. 12 and 13.

LEON ZITVER, *Primary Examiner.*

NICHOLAS S. RIZZO, BERNARD HELFIN, *Examiners.*

N. S. MILESTONE, R. H. LILES, *Assistant Examiners.*